June 11, 1963  A. E. SHAW ETAL  3,093,375
PIN DETECTION MEANS

Filed April 18, 1960  2 Sheets-Sheet 1

INVENTORS.
Albert E. Shaw
Sampson Isenberg
Robert J. Moon
By Hofgren, Brady, Wegner,
Allen & Stellman
Attys.

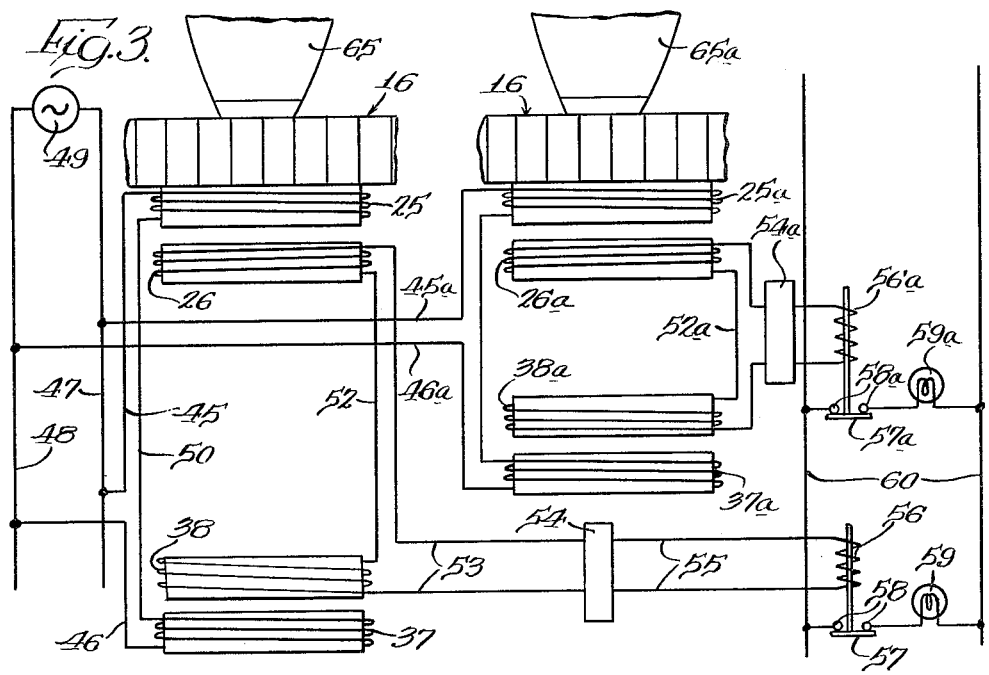
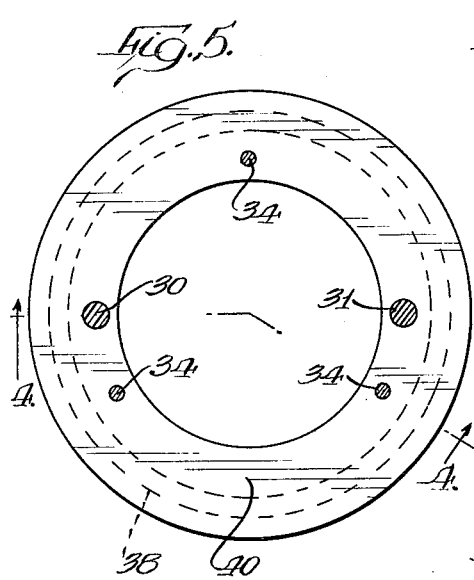
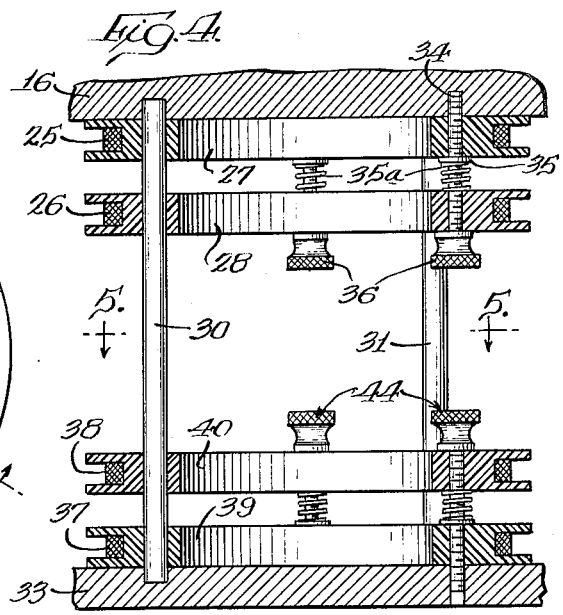

United States Patent Office 3,093,375
Patented June 11, 1963

3,093,375
PIN DETECTION MEANS
Albert E. Shaw, Sampson Isenberg, and Robert J. Moon, Chicago, Ill., assignors, by mesne assignments, to Brunswick Corporation, Chicago, Ill., a corporation of Delaware
Filed Apr. 18, 1960, Ser. No. 23,092
9 Claims. (Cl. 273—52)

This invention relates to bowling, and more particularly to detection of bowling pins on a bowling alley for the purpose of providing a signal indicative of pinfall for actuating an indicating means for announcing the results of bowling.

It is a general object of the invention to provide a new and improved pinfall detection apparatus.

A more specific object is to provide a new and improved apparatus for distinguishing between the presence and absence of standing pins on a bowling alley and giving a signal indicative of pinfall including a pair of mutual inductance devices which are balanced under one condition, either the presence or absence of pins, and unbalanced when the other condition exists to provide a signal indicating the existence of the other condition.

In a preferred construction, at each pin spot one mutual inductance device is mounted under the alley to detect the presence of a standing pin on the pin spot or off the pin spot in a predetermined area comparable to the range of pickup means on an automatic pinsetter, the other mutual inductance device is mounted as desired, remotely or otherwise, an alternating current source is connected to energize the primary coils in both mutual inductance devices, the secondary coils of the mutual inductance devices are connected in opposition to each other in an indicating circuit, and means is provided for adjusting one mutual inductance device to balance the output from the secondary coils so that they are equal and opposite and cancel each other in the absence of a standing pin but are unbalanced when a pin is standing within the area of detection to thereby provide a signal indicating a standing pin.

An important advantage of a detecting means of the dscribed type resides in the latitude allowed in mounting the detection means under the alley thereby avoiding the necessity of modifying the alley and avoiding the necessity of mounting the detection means on moving parts of a pinsetter, such as the pinsetting deck which requires a movement of the deck into the proximity of the alley in order to be capable of detection. Another important advantage of the detecting means of this invention resides in its capacity to detect bowling pins which are electrically nonconductive, nonmetallic and nonmagnetic in the common sense of these words.

Other objects and advantages will become readily apparent from the following detailed description taken in connection with the accompanying drawings, in which:

FIG. 3 is a wiring diagram including detecting means for pin spots at two positions on the bowling alley;

Figure 1:
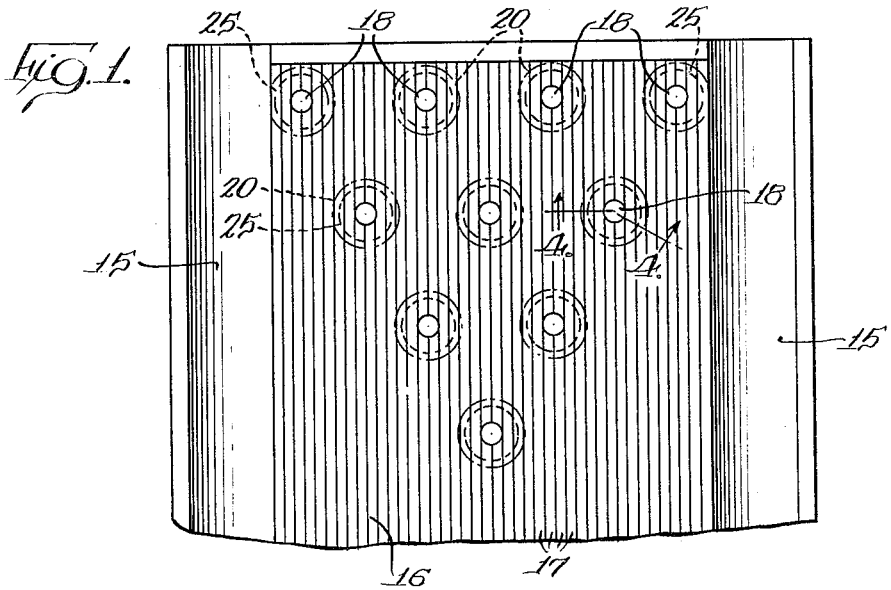
FIG. 1 is a fragmentary plan view of a bowling alley illustrating the general arrangement in which pins are normally set on the alley adjacent the pit in preparation for the rolling of a ball by a bowler.

FIG. 4 is a sectional view at about the line 4—4 of FIGS. 1 and 5, illustrating a means for mounting mutual inductance coils; and FIG. 5 is a sectional view at about the line 5—5 of FIG. 4.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, FIG. 1 illustrates the pit end of a typical bowling alley including gutters at opposite sides of the alley as at 15 and an alley proper as at 16 providing an upper surface on which pins may be set and along which a ball may be rolled at the pins. Normally, the alley is comprised of a plurality of laminated side by side wood strips as at 17, though other materials may be utilized. It is intended that pins would be initially set on the alley at ten pin spots represented by solid line circles as at 18.

In many bowling establishments nowadays, automatic pinsetter machines are utilized for setting and resetting pins on the alley in proper sequence relationship to the balls thrown. During the progress of a game, it is not unusual for a pin to "walk off" a pin spot after being nudged by a ball or another pin and still remain standing so that it must be lifted from the alley while the alley is swept and then reset upon the alley preferably in the off spot position assumed. Most modern day automatic pinsetter machines include pickup and resetting devices which are capable of lifting off spot pins within a predetermined range and resetting the pins in the off spot position.

A typical range of pin pickup is illustrated by the broken line circles 20 approximately three times the diameter of the pin base, though the size may vary and the shape of the off spot area may vary from circular to rectangular or some other shape, depending upon the nature of the pin pickup devices.

In some bowling alleys, the pin spots 18 as well as the off spot areas 20 may all form an integral part of a unitary alley construction comprised solely of wood laminae 17. In other constructions, the pin spots 18 and/or the off spot areas 20, whether these define the pinsetter pickup range or not, may be defined by inserts in the otherwise wooden alley construction, such inserts being comprised of plastic or the like reinforced with fiber, for example, The inserts prolong the life of the alley in areas where pins are sometimes dropped or handled roughly when placed in position.

In any automatically operating pinfall detecting apparatus, it is highly desirable to provide for detection of off spot pins within the range of the pickup devices as well as detection of pins which remain on spot, or otherwise an inaccurate indication of results will follow. As shown in FIGS. 3, 4 and 5, a pin detecting means is provided under each pin spot for detecting standing pins either on spot or off spot within a range such as that indicated by areas 20.

The pin detecting means at each pin spot comprises a sensing means for distinguishing between a first condition represented by a pin standing on spot or off spot within the area described surrounding the spot and a second condition represented by the total absence of any pins or by one more fallen pin within the detection area. Though one or more fallen pins may produce a slight signal, the signal would not be significant and the entire detection system is initially adjusted so that the reduce drelatively weak signal occurring on the presence of one or more fallen pins would not give an indication of a standing pin.

The sensing means comprises a pair of mutual inductance devices which may be balanced when there is no pin standing and which are rendered out of balance when a pin is standing within the detection area so as to give a suitable signal. The first mutual inductance device is mounted immediately beneath the pin spot and surrounding area 20 and comprises a pair of loosely coupled coils 25 and 26 (FIGS. 3, 4 and 5) on suitable non-conductive support means such as spools 27 and 28. The coils 25 and 26 which are not physically connected, are wound about an upright axis normal to the surface of the alley and are inductively associated somewhat as transformer coils so that when the first or primary coil is energized by an alternating current source, a potential is induced in the secondary coil. The diameter of the coils 25 and 26 may be slightly less than the diameter of circle 20, but this relationship may vary depending upon the particular installation and especially the proximity of the coil to the surface of the alley. In one embodiment tested, the circle 20 has a diameter about one inch greater than the coil, and a pin standing with half or more of its base end in the circle is detected while a standing pin with less than half the base end in the circle is not detected.

In the construction illustrated, the spools 27 and 28, are mounted on a pair of upright parallel rods as at 30 and 31 having upper ends suitably secured to the alley 16 and lower ends suitably secured to a support 33. The upper spool 27 is fixed beneath the alley as by screws 34 and collars 35 fixed thereon while the lower spool 28 is slidable vertically on rods 30 and 31 and screws 34 under control of adjustment means such as knurled adjustment nuts 36 on the screws 34 which facilitate physical adjustment of one coil relative to the other. Springs 35a urge the lower spool 28 against the nuts 36.

The second mutual inductance device in each sensing device includes a pair of loosely coupled coils 37 and 38 on non-conductive supports 39 and 40 in the form of spools similar to those previously described. The coils 37, 38 possess the same degree of coupling as coils 25, 26, but because these are not directly related to the pins or the detecting areas, their diameter need not conform to that of coils 25 and 26 but may vary as desired. In the construction chosen for illustration, the spools 39 and 40 are mounted on rods 30 and 31, the lower roll 39 being secured to the support 33 and the upper spool 40 being adjustable on the rods by means 44 similar to that described for adjusting spool 28.

It will be understood that it is not necessary that the second mutual inductance device represented by coils 37 and 38 be mounted physically adjacent the first mutual inductance device represented by coils 25 and 26, but that the former may be mounted in any convenient location either beneath the alley or at some convenient location completely remote from the alley. If the two mutuals are mounted adjacent each other a shield (not shown) may be provided therebetween so that one has no effect on the other. Also, it should be understood that it is not necessary to provide for adjustment in both mutual inductances, but that the first (25, 26) may be fixed, and the second (37, 38) adjustable while located remotely from the underside of the alley at a position conveniently accessible for adjustment.

At illustrated, the coils 25 and 37 are utilized as primary coils and the coils 26 and 38 are secondary coils, though it may be vice versa. The primary coils of the two mutual inductances are both excited from a common alternating current source as by wires 45 and 46 (FIG. 3) connected respectively to wires 47 and 48 which are in turn connected across a source represented at 49. Opposite ends of the coils are connected together as at 50. The secondary coils 26 and 38 are connected together as at 52 and are connected in a circuit as at 53 in opposition to each other and in series with a suitable form of indicating means.

The indicating means may comprise a suitable amplifying means as at 54 of a conventional commercially available type connected in the circuit 53 and having its output connected in a circuit 55 including a relay 56 controlling a movable switch contact 57 for bridging stationary switch contacts 58 to energize a lamp 59 connected across a source represented by the wires 60.

The secondary coils 26 and 38 are connected electrically so that the potential across coil 26 is 180 degrees out of phase with respect to the potential across coil 38. As the primary coils are excited from a common source, one or both of the secondary coils may be adjusted so that the outputs from the secondary coils are equal as well as opposite and therefore cancel each other in the absence of a standing pin so that no signal is produced in circuit 53 at the indicating means under these conditions. On the other hand, upon the presence within the area of detection of a standing pin as at 65 containing a material for disturbing the balance of the two mutual inductances, the outputs from the secondaries will be unequal thereby providing a signal indicating the presence of the standing pin.

In operation, in the absence of a standing pin there is no signal at the amplifier 54, the relay coil 56 is de-energized, the contacts 58 are open and the lamp 59 is unlit. When a pin is standing in the detection area as illustrated, a signal at the amplifier 54 causes energization of coil 56 closing the contacts 58 thereby lighting the lamp 59.

It will be understood of course that the mutual inductance devices may, if desired, be balanced while a pin is standing and be unbalanced in the absence of a pin. Under these conditions, the relay would be energized on the absence of a pin and contacts 58 closed or opened as desired, to correspondingly energize or de-energize lamp 59. In the wiring diagram of FIG. 3 the elements of a second detecting means at a second pin spot are designated by similar reference numbers with the suffix "a." The lamps 59 associated with each of the pin spots are preferably all connected across the same source represented by wires 60, and the primary coils of all of the mutual inductances at each of the pin spots may be energized from a common source as at 47, 48. In one form of the invention an alternating potential of 2,000 cycles per second is used at 49 to excite the primaries but it will be understood that with the proper impedance match, lower or higher frequencies may be used, including 60 cycle sources conventionally available commercially.

Figure 2:
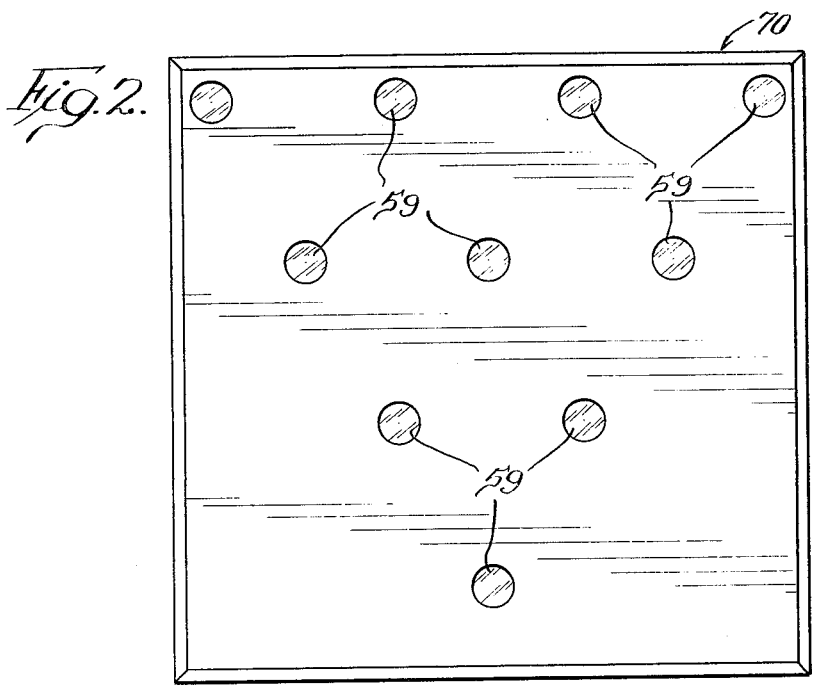
FIG. 2 is a diagrammatic elevational view of a form of indicating means which may be controlled by pinfall detecting apparatus embodying the principles of the present invention.

The lamps 59 are preferably arranged physically on an indicating panel as illustrated at 70 in FIG. 2 in a triangular arrangement corresponding to the triangular arrangement of pins when properly set on the alley for bowling so that energized lamps indicate standing pins and unlit lamps indicate the absence of standing pins. An indicating device of this nature is helpful to bowlers, particularly the uninitiated or novice, when only a few pins remain standing and one of them is directly behind another such as the #2 and #8 pins or the #3 and #9 pin, because the rearmost pin in these cases is not readily visible to the bowler at the approach end of the alley.

It should be understood that the indicating means illustrated herein in the form of lamps for indicating that standing pins are present or absent at the ten pin spot positions on the alley is only one form of indicating means that may be controlled by the mutual indictance detecting system, and that other forms of indicating devices may be controlled by the detecting means, if desired, such as a pinfall indicator for giving the number of pins felled after each ball rolled in a frame, or a scoring device for keeping a running score frame by frame, in the manner taught, for example, in the copending application of Robert Torresen, filed March 26, 1959, as Serial No. 802,152, and now Patent No. 3,011,785 (assigned to the assignee of this application), and through the medium of a suitable scanning switch and/or other switching devices as disclosed in said copending application.

It will be understood that the capacity of the detecting system of this invention to detect the presence or absence of pins and to distinguish between a first condition represented by standing pins and a second condition represented by fallen pins or the absence of pins depends upon the use of pins having material exhibiting magnetic properties capable of upsetting the balance of the mutual inductances to provide a signal indicative of the condition detected, whether this be the presence or absence of standing pins. Prior art pins have included plates, rings, slugs or other portions of metallic, conductive, or magnetic materials and a system constructed according to the principles of the present invention may be made to detect such pins. However, pins of this type are undesirable in some respects because they usually involve the inclusion of materials which alter the weight, balance or action of the pin from the standards set by the American Bowling Congress and customarily maintained in most bowling establishments. Further, a very sensitive detecting system may be incapable of distingulishing between standing and fallen pins of this type. An important advantage of the present invention resides in its capacity for detecting pins which are not metallic, conductive or magnetic in the common sense of these words but contain only minute quantities of material having limited magnetic properties which allow a pin construction conforming substantially in materials, appearance and playing characteristics to the standards set by the American Bowling Congress.

We claim:

1. In combination with a bowling alley having a plurality of pin spots at positions where pins are set upright on the alley for bowling: apparatus for detecting the presence of standing pins of limited magnetic character on the alley at each pin spot and in a predetermined annular area surrounding each pin spot, comprising a plurality of sensing means one associated with each pin spot for distinguishing between a first condition represented by the presence of a standing pin on spot or off spot in said predetermined surrounding area and a second condition represented by the absence of a standing pin from the spot and surrounding area, each sensing means including a first mutual inductance device comprising support means positioned beneath the alley at the associated pin spot having a pair of loosely coupled, axially spaced coils wound thereon about an axis normal to the surface of the alley and effectively encompassing an area equal to that of the assoicated pin spot and surrounding area, the inductive capacity of said first mutual inductance being alterable by the change from said first condition to said second condition and vice versa, a second mutual inductance device spaced from the first comprising a pair of loosely coupled coils, an alternating current source for energizing the primary coils of both mutual inductance devices, means for adjusting one coil of the second mutual inductance device relative to the other coil of the second mutual inductance device to balance the mutual inductances and provide equal outputs from the secondary coils thereof when said second condition exists and unequal outputs when the first condition exists, and a circuit connecting the secondary coils in opposition to each other to provide a signal when the outputs therefrom are unequal; and an indicating means connected with each of said circuits for utilizing the signals from each of the sensing means to give a visible indication of the results of bowling as represented by the conditions sensed.

2. In combination with a bowling alley having a plurality of pin spots at positions where pins are set upright on the alley for bowling: apparatus for detecting on the alley at each pin spot the presence of standing pins having predetermined magnetic properties capable of altering the inductive capacity of a mutual inductance, comprising, a plurality of sensing means one associated with each pin spot for distinguishing between a first condition represented by the presence of a standing pin and a second condition represented by the absence of a standing pin, each sensing means including a first mutual inductance device positioned beneath the alley at the associated pin spot comprising a pair of loosely coupled coils wound about an axis normal to the surface of the alley, a second mutual inductance device comprising a pair of loosely coupled coils, an alternating current source for energizing the primary coils of both mutual inductance devices means for adjusting a physical characteristic of the second mutual inductance device to balance the mutual inductances and provide equal outputs from the secondary coils of the mutual inductance devices when said second condition exists and unequal outputs when the first condition exists, and a circuit connecting the secondary coils in opposition to each other to provide a signal when the outputs therefrom are unequal; and means for utilizing the signals from each of the sensing means to give results of bowling as indicated by the conditions sensed.

3. In combination with a bowling alley having a plurality of pin spots at positions where pins are set upright on the alley for bowling: apparatus for detecting the presence or absence of standing pins of predetermined magnetic characteristics on the alley at each pin spot, comprising, a plurality of sensing means one associated with each pin spot for distinguishing between a first condition represented by the presence of a standing pin and a second condition represented by the absence of a standing pin, each sensing means including a first mutual inductance device comprising a support positioned beneath the alley at the associated pin spot having a pair of coils wound thereon, a second mutual inductance device, an alternating current source for energizing the primaries of both mutual inductance devices, means for adjusting the second mutual inductance to provide equal outputs from the secondaries of the mutual inductance device when one of said conditions exists and unequal outputs when the other of said conditions exists, and a circuit connecting the secondaries in opposition to each other to provide a signal when the outputs therefrom are unequal; and means for utilizing the signals from each of the sensing means.

4. In combination with a bowling alley having a plurality of pin spots at positions where pins are set upright on the alley for bowling: apparatus for detecting the presence of standing pins of predetermined magnetic characteristics on the alley at each pin spot, comprising, a plurality of sensing means one associated with each pin spot for distinguishing between a first condition represented by the presence of a standing pin on spot and a second condition represented by the absence of a standing pin from the spot, each sensing means including a first mutual inductance device positioned beneath the alley at the associated pin spot comprising a pair of coils wound about an axis normal to the surface of the alley, a second mutual inductance device comprising a pair of coils, an alternating current source for energizing the primary coils of both mutual inductance devices, means for adjusting one of the mutual inductance devices to provide equal outputs from the secondary coils of the mutual inductance devices when said second condition exists and unequal outputs when the first condition exists, and a circuit connecting the secondary coils in opposition to each other to provide a signal when the outputs therefrom are unequal.

5. In combination: apparatus for detecting the presence or absence of standing pins at each pin spot on a bowling alley, comprising, a plurality of sensing means one for each pin spot for distinguishing between a first condition represented by the presence of a standing pin and a second condition represented by the absence of a standing pin, each sensing means including a first mutual inductance device comprising a pair of inductively coupled coils having an inductive capacity alterable by movement of magnetic material relative to one coil, a second mutual inductance device comprising a pair of inductively coupled coils, the primary coils of both mutual inductance device being capable of energization from a common alternating current source, means for balancing the mutual inductance devices to provide equal outputs from the secondary coils thereof when one of said conditions exists and unequal outputs when the other of said conditions exists, and a circuit connecting the secondary coils in opposition to each other to provide a signal when the outputs therefrom are unequal; and an indicating means connected in each of said circuits for utilizing the signals from each of said sensing means to give a visible indication of the conditions sensed.

6. In combination with a bowling alley having a pin spot at a position where a pin may be set upright on the alley: apparatus for detecting the presence of a standing pin on the pin spot by distinguishing between a first condition represented by the presence of a standing pin and a second condition represented by the absence of a standing pin, comprising, a first mutual inductance device including a pair of axially spaced coils wound about an axis normal to the surface of the alley, a second mutual inductance device comprising a pair of coils, an alternating current source for energizing the primary coils of both mutual inductance devices, means for adjusting the second mutual inductance device to provide equal outputs from the secondary coils of the mutual inductance devices when said second condition exists and unequal outputs when said first condition exists, and a circuit connecting the secondary coils in opposition to each other to provide a signal when the outputs therefrom are unequal.

7. In combination with a bowling alley, apparatus for detecting the presence or absence of a standing bowling pin on the alley by distinguishing between a first condition represented by a standing pin and second condition represented by a fallen pin or by the absence of a pin, comprising, a first mutual inductance device positioned adjacent a pin spot on the alley, a second mutual inductance device, an alternating current source connected for energizing the primaries of both devices, said devices being balanced to provide equal and opposite outputs from the secondaries when one of said conditions exists and to provide unequal outputs from the secondaries when the other condition exists, and a circuit connecting the secondaries of the mutual inductances to provide no signal when the outputs from the secondaries are equal and a signal when the outputs from the secondaries are unequal.

8. In combination with a bowling alley having a plurality of pin spots at positions where pins are set up right on the alley for bowling: a plurality of pins adapted to be set up respectively at the pin spots, each including a magnetically permeable material capable of altering the mutual inductance of a mutual inductance device, apparatus for detecting the presence or absence of standing pins at the pin spots, comprising, a plurality of sensing means one associated with each pin spot for distinguishing between a first condition represented by the presence of a standing pin and a second condition represented by the absence of a standing pin, each sensing means including a first mutual inductance device positioned adjacent the pin spot and having a mutual inductance alterable by the change from said first condition to said second condition and vice versa, a second mutual inductance device, an alternating current source connected for energizing the primaries of both mutual inductance devices, said mutual inductances producing balanced outputs from the secondaries thereof when one of said conditions exists and unequal outputs when the other condition exists, and a circuit connecting the secondaries of the mutual inductances to provide no signal when the outputs from the secondaries are equal and a signal when the outputs from the secondaries are unequal.

9. In combination with a bowling alley having a plurality of pin spots at positions where pins are set upright on the alley for bowling: a plurality of pins adapted to be set up respectively at the pin spots, each including a magnetically permeable material capable of altering the mutual inductance of a transformer, apparatus for detecting the presence or absence of standing pins at the pin spots, comprising; a plurality of sensing means one associated with each pin spot for distinguishing between a first condition represented by the presence of a standing pin and a second condition represented by the absence of a standing pin, each sensing means including a first transformer having a primary and a secondary winding positioned adjacent the pin spot and having a coefficient of coupling therebetween alterable by the change from said first condition to said second condition and vice versa; a second air core transformer; an alternating current source connected for energizing the primaries of said transformers, said transformers producing balanced outputs from the secondaries thereof when one of said conditions exists and unequal outputs when the other condition exists, and a circuit connecting the secondaries of the transformers to provide no signal when the outputs from the secondaries are equal and a signal when the outputs of the secondaries are unequal.

References Cited in the file of this patent

UNITED STATES PATENTS

| | | |
|---|---|---|
| 2,228,293 | Wurzbach | Jan. 14, 1941 |
| 2,492,182 | Robinson | Dec. 27, 1949 |
| 2,646,559 | Nutzler | July 21, 1953 |
| 2,782,406 | Krakora | Feb. 19, 1957 |
| 2,980,424 | Sanders et al. | Apr. 18, 1961 |